United States Patent [19]
Owechko et al.

[11] Patent Number: 5,737,083
[45] Date of Patent: Apr. 7, 1998

[54] MULTIPLE-BEAM OPTICAL POSITION SENSOR FOR AUTOMOTIVE OCCUPANT DETECTION

[75] Inventors: Yuri Owechko, Newbury Park; K. Wojtek Przytula, Malibu, both of Calif.

[73] Assignee: Delco Electronics Corporation, Kokomo, Ind.

[21] Appl. No.: 797,705

[22] Filed: Feb. 11, 1997

[51] Int. Cl.⁶ .................................................. G01B 11/24
[52] U.S. Cl. ..................... 356/375; 356/376; 250/559.22
[58] Field of Search ..................... 356/375, 376, 356/139.03, 152.2; 250/559.23, 559.22, 559.27

[56] References Cited

U.S. PATENT DOCUMENTS

| | | | |
|---|---|---|---|
| 4,089,608 | 5/1978 | Hoadley | 356/376 |
| 4,708,483 | 11/1987 | Lorenz | 356/376 |
| 4,896,962 | 1/1990 | Menn et al. | 356/139.03 |
| 5,182,614 | 1/1993 | Lill | 356/376 |
| 5,241,606 | 8/1993 | Horie | 356/376 |
| 5,416,591 | 5/1995 | Yoshimura et al. | 356/376 |
| 5,528,698 | 6/1996 | Kamei et al. | 250/227.15 |
| 5,585,625 | 12/1996 | Spies | 250/221 |

Primary Examiner—Frank G. Font
Assistant Examiner—Zandra V. Smith
Attorney, Agent, or Firm—Jimmy L. Funke

[57] ABSTRACT

An optical sensor system for measuring the approximate three-dimensional profile and position of an object. A reduced to practice embodiment of the optical sensor system has been used to measure the three-dimensional profile and position of an object within a range of 40 inches to 2 inches with high accuracy and high update rates (>1 KHz). The sensor system generates a set of optical beams using a projection lens and multiple light emitting diodes (LED) located in a back focal plane of the projection lens. The position of each LED determines the angle of a beam transmitted thereby. By turning on each LED sequentially in time, a set of beams is generated at various angles that illuminates the object to produce a set of spots on the object. The range from each LED to each of the spatially-separated illuminated spots on the object is determined by imaging the spots onto a two-dimensional transverse-effect photodiode. Signals derived from a pair of photocurrent outputs from the photodiode are processed to determine the positions of the spots on the two-dimensional transverse-effect photodiode. Computations are performed that implement optical triangulation to determine the range and approximate three-dimensional profile to the object.

7 Claims, 4 Drawing Sheets

MULTIPLE-BEAM OPTICAL POSITION SENSOR FOR AUTOMOTIVE OCCUPANT DETECTION

BACKGROUND

The present invention relates generally to optical position sensors, and more particularly, to multiple-beam optical position sensor systems for use in detecting occupants in a vehicle.

Currently, no system is used in commercially-available automobiles to measure the position or locations of occupants automatically. Takata Corp. manufactures an infrared sensor for position detection but it apparently uses a single beam and a proprietary ranging algorithm. Temic Corp. also manufactures a infrared sensing system but the details of the system are also proprietary.

In general, technology that has been described in the open literature relating to the present invention relates to triangulation ranging systems used in autofocus cameras. These systems are based on one-dimensional transverse-effect photodiodes. Unlike the present invention, the triangulation ranging systems utilize a single light beam along which range is measured. The accuracy and range requirements are much different for a camera systems because they must measure position over a large range of distances with much less accuracy than is required for automotive occupant sensing. In addition, the triangulation ranging systems do not provide a three-dimensional profile of the occupants.

Systems using both ultrasonic time-of-flight-based range sensors and single-beam triangulation-based optical range sensors have been described in the literature for potential automotive applications. The disadvantages of ultrasound sensors include slow response and false signals due to echoes. Single-beam optical sensors are limited in the amount of information they can gather since they cannot generate a three-dimensional profile.

VTT Electronics, based in Finland, has developed a sensor that uses one dimensional transverse-effect photodiodes. This sensor is discussed in a German magazine entitled "Elektronik Industie" Finnish Patent No. 91999 also relates to this sensor, which corresponds to a PCT publication number WO 92/19984, published 12 Nov. 1992. The PCT document discloses the use of multiple LED die behind a single lens to generate multiple time-multiplexed optical beams for range measurement. The detector is a one dimensional transverse-effect photodiode, and the use of a two-dimensional photodiode is not mentioned. They don't mention the airbag application.

It is therefore an objective of the present invention to provide for optical sensor systems for measuring the approximate three-dimensional profile and position of objects. It is also an objective of the present invention to provide for multiple-beam optical position sensor systems for use in detecting occupants in a vehicle.

SUMMARY OF THE INVENTION

In order to meet the above and other objectives, the present invention is a low cost optical sensor system for measuring the approximate three-dimensional profile and position of objects. A reduced to practice embodiment of the optical sensor system has been used to measure the three-dimensional profile and position within a range of 40 inches to 2 inches from the sensor with high accuracy and high update rates (>1 KHz). The sensor system generates a set of optical beams using a single projection lens and a photodiode assembly comprising multiple light emitting diodes (LEDs) located in a back focal plane of the projection lens. The position of each LED determines the angle of a beam transmitted by the projection lens. By turning on each LED sequentially in time, a set of beams is generated at various angles without moving parts and very inexpensively. The set of beams illuminates an object with a set of spatially-separated spots on the object.

The range from the sensor to each of the spatially-separated illuminated spots on the object is determined by imaging the spots one at a time onto a two-dimensional transverse-effect photodiode. A pair of photocurrent outputs from the photodiode is used to determine the positions of the spot images on the photodiode. The principle of optical triangulation is then used to determine the range to the object. By varying the angle and position of the photodiode assembly relative to the imaging lens, the accuracy of the range measurement at larger ranges can be improved.

The present invention may be used in conjunction with airbags manufactured by the assignee of the present invention. One specific purpose of the present invention is to measure the position of an occupant in an vehicle relative to an airbag. The update rate is fast enough to measure the occupant position as a function of time during a crash. in addition, it can be used to recognize that an adult or child is sitting in the seat as opposed to inanimate objects, such as an infant seat, or an empty seat. The system is automatic and non-intrusive since the infrared light beams are invisible to humans. Currently, no system is used in automobiles to automatically and continuously measure the positions of occupants.

The present sensor system provides position values for each of the projected spots on an object with an update time of less than 100 microseconds per spot. Tens to hundreds of projected spots may be used to measure the three-dimensional profile of the object. The additional information provided by the multiple beams makes more robust measurement and recognition algorithms possible and provides significant immunity to occlusions of the beams.

The benefits of an occupant position measurement and recognition system include the ability to automatically disable the airbag if the occupant is in a dangerous position (too close to the airbag) or if the seat is empty or if an infant seat is present. In addition, information regarding the occupant's three-dimensional profile may be used to select the deployment velocity of a new generation of variable-deployment airbags. Use of the occupant position measurement system improves the safety and cost effectiveness of airbags by preventing dangerous or unnecessary deployment. The present system may also be used to automatically adjust headrest, seat, and mirror positions according to the dimensions of an occupant and to monitor a driver for collision warning and avoidance.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
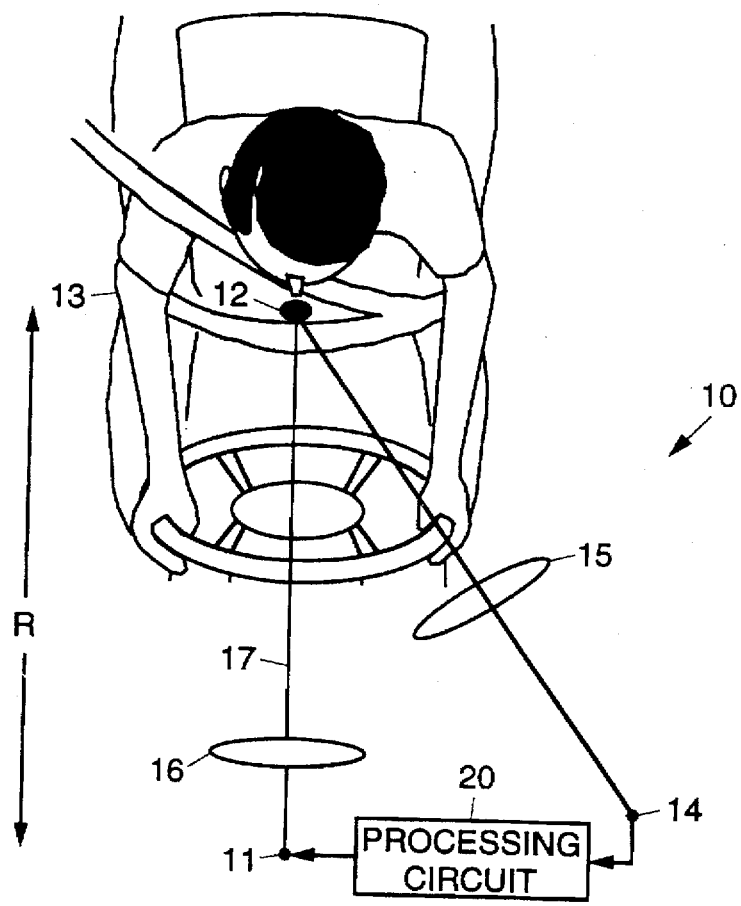
FIG. 1 illustrates a single-beam optical position measurement system.

Referring to the drawing figures, FIG. 1 illustrates a single-beam optical position measurement system 10. The principle upon which the present invention is based is illustrated in FIG. 1 for the single-beam range sensor system 10. Sensor systems similar to that shown in FIG. 1 are used in a variety of ranging applications, including autofocus cameras, for example.

A collimated beam 17 (produced by a lens 16, for example) derived from a light source 11, such as a light emitting diode (LED) 11, illuminates a spot 12 on an object 13, such as a driver of a vehicle. The spot 12 is imaged by an imaging lens 15 onto a one-dimensional transverse-effect photodiode 14. The transverse-effect photodiode 14 is displaced from the LED 11. As the range (R) of the object 13 varies, the position of the imaged spot 12 moves along the long axis of the transverse-effect photodiode 14. The position of the spot 12 on the transverse-effect photodiode 14 can be calculated in a processing circuit 20 from the formula $P=(I_1-I_2)/(I_1+I_2)$, where $I_1$ and $I_2$ are current outputs from first and second anodes 14a, 14b or photocurrent outputs 14a, 14b (FIG. 2) of the transverse-effect photodiode 14. P is invariant to changes in illumination level or object reflectance. The range of the illuminated spot 12 can then be calculated from P and knowledge of the geometry of FIG. 1.

Figure 2:
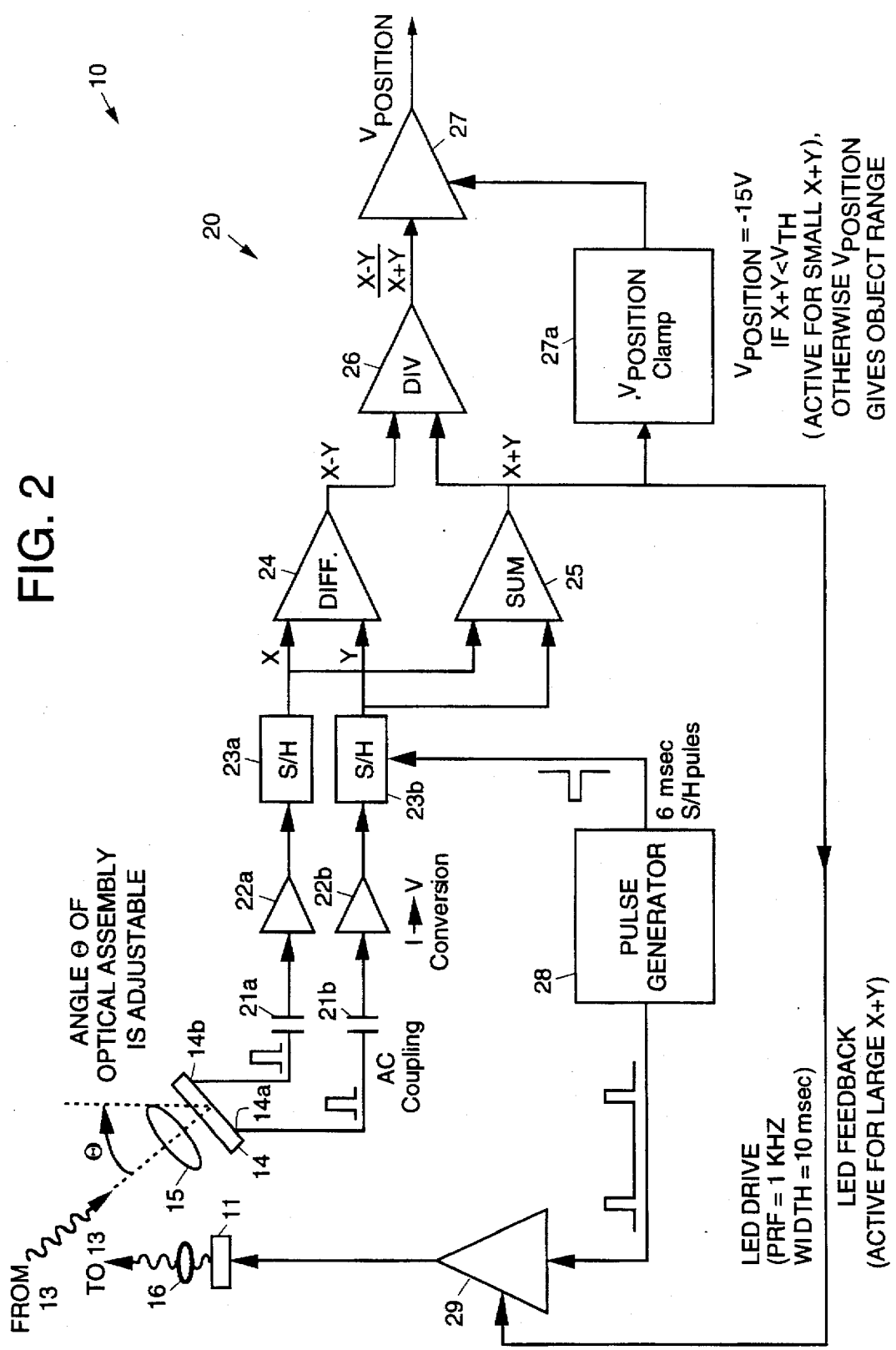
FIG. 2 illustrates a multiple-beam optical position sensor system in accordance with the principles of the present invention.

Details of a reduced to practice processing circuit 20 that was developed and tested to implement the system 10 are shown in FIG. 2. It is to be understood that the processing circuit 20 may also be used to implement the system 30 of the present invention shown and described with reference to FIG. 3 below. The processing circuit 20 uses analog electronics to calculate P. The processing circuit 20 has AC coupling capacitors 21a, 21b coupled between respective anodes 14a, 14b or photocurrent outputs 14a, 14b of the transverse-effect photodiode 14 and first and second amplifiers 22a, 22b that convert current to voltage. Outputs of the amplifiers 22a, 22b are coupled to first and second sample and hold (S/H) circuits 23a, 23b. The output of the first sample and hold circuit 23a produces an x value for the position of the spot 12 on the object 13. The output of the second sample and hold circuit 23b produces a y value for the position of the spot 12 on the object 13.

The x and y values are coupled to inputs of difference (DIFF) and sum (SUM) circuits 24, 25 whose outputs are coupled to a divider (DIV) 26. The output of the divider 26 produces a value (x−y)/(x+y) which is applied to an output amplifier 27 which produces an output voltage ($V_{POSITION}$) that corresponds to the range from the LED 11 to the object 13. The output voltage ($V_{POSITION}$) corresponds to the voltage value (x−y)/(x+y) when the range is greater than a predetermined threshold, and corresponds to a predetermined fixed voltage value derived from a voltage clamping circuit 27a when the range is less than the predetermined threshold. The output of the sum circuit 24 is fed back to a LED drive amplifier 29 which is pulsed by means of a pulse generator 28. The pulse generator 28 also drives the sample and hold circuits 23a, 23b.

The range of distances that the sensor system 10 can measure is determined by the separation (D) between the LED 11 and transverse-effect photodiode 14, the focal length (f) of the imaging lens 15, the length (L) of the one-dimensional transverse-effect photodiode 14, and the look-angle (θ) of the transverse-effect photodiode 14. It has been determined theoretically and experimentally that values of f=6 mm, D=25 mm, L=3.5 mm, and θ=15 degrees provides resolution of 0.5 inches over a 2 inches to 40 inches working range necessary for vehicle occupant sensing. A working prototype of the single-beam sensor system 10 shown in FIG. 2 provides range updates every millisecond.

Figure 3:
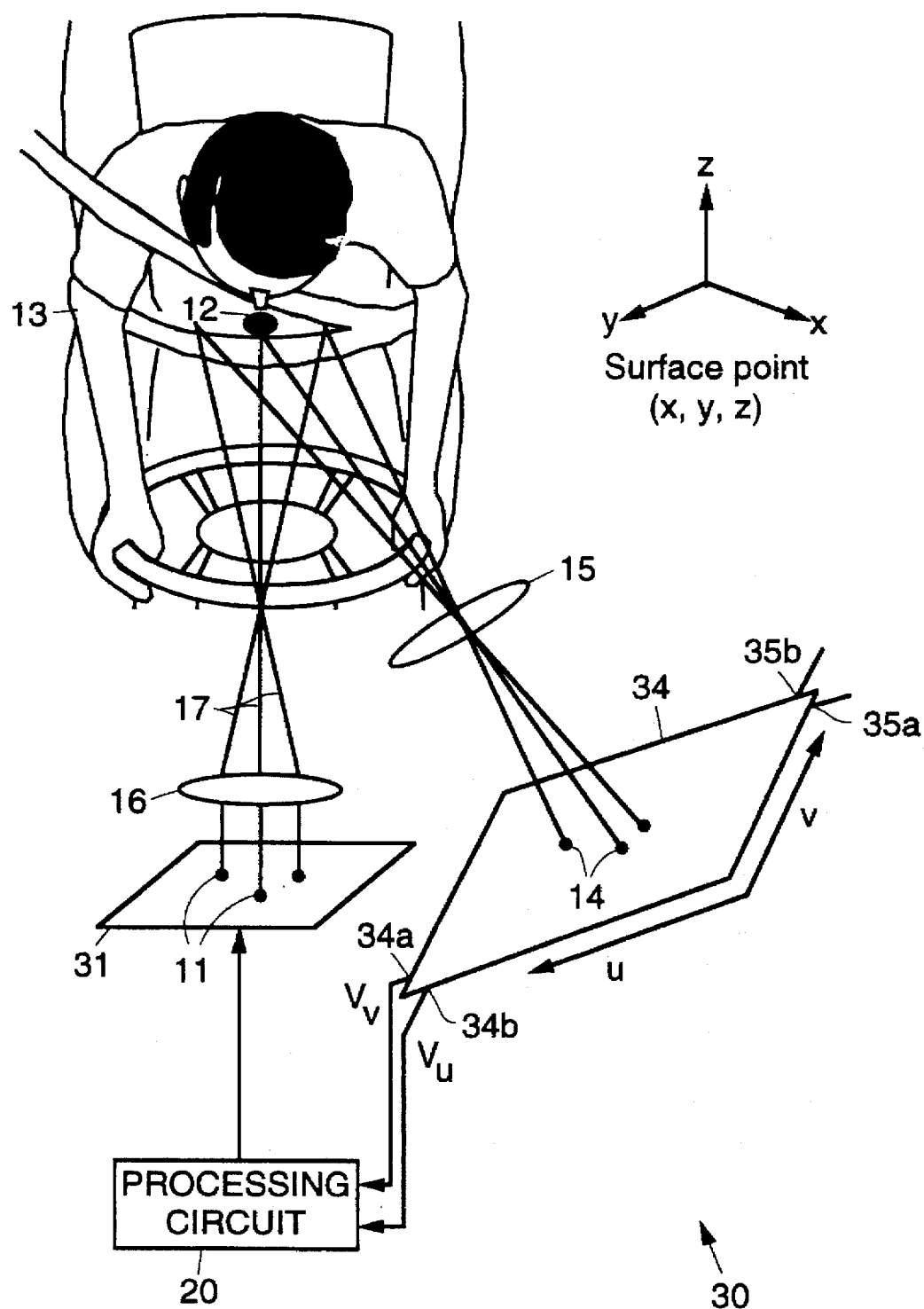
FIG. 3 shows a detailed block diagram of an embodiment of the occupant position sensor circuit of FIG. 1.

However, the present invention involves a generalization of the single-beam system 10 (which only measures range along a single line in space) to multiple beams. The multiple-beam position measurement system 30 of the present invention provides fast updates of a three-dimensional profile of the object 11 by measuring ranges along a multiplicity of arbitrarily-oriented lines in space. A diagram illustrative of the multiple-beam optical position sensor system 30 of the present invention is shown in FIG. 3.

The multiple-beam optical position sensor system 30 will be described with reference to FIG. 3, and is also based on the principle of triangulation. With reference to FIG. 3, the multiple-beam optical position sensor system 30 comprises a light emitting diode (LED) array projector 31 that includes a plurality of light emitting diodes 11. The plurality of light emitting diodes 11 generate a set of optical beams 17 that illuminate the object 11. The beams 17 are time-multiplexed under control of an appropriately modified processing circuit 20, wherein only one beam 17 is turned on at any one time. Each beam 17 may have different deflection angles (θ, φ) which results in arbitrary two-dimensional arrangements of illumination spots 12 on the object 11. The deflection angles (θ, φ) are determined from the equations $\theta=\mathrm{Tan}^{-1}(x_{LED}/f)$ and $\phi=\mathrm{Tan}^{-1}(y_{LED}/f)$.

The illuminated spots 12 are imaged onto a two-dimensional transverse-effect photodiode 34. The two-dimensional transverse-effect photodiode 34 is elongated along x and y dimensions to accommodate shifts in the imaged spots 12 along both x and y directions. The two-dimensional transverse-effect photodiode 34 has two pairs of anodes 34a, 34b or photocurrent outputs 34a, 34b for the x and y directions, although only one pair is required. Such two-dimensional transverse-effect photodiodes 34 are commercially available, such as from Hamamatsu, for example. Formulas similar to those described above are used to determine the (x, y) location of the imaged spot 12 on the two-dimensional transverse-effect photodiode 34. Each optical beam 17 measures the range to the object 11 along the direction of that beam 17. Because of the different angles of the respective beams 17, the imaged spots 12 trace unique trajectories on the two-dimensional transverse-effect photodiode 34 as the object 11 moves and as the three-dimensional profile of the object 11 changes. Since the geometry of the system 30 is known, outputs from only one pair of anodes 34a, 34b or photocurrent outputs 34a, 34b is required to determine the range along the direction of a particular beam 17.

Outputs from a second pair of anodes 35a, 35b may be used to determine the validity of the range measurement since the path that each spot 12 follows on the two-dimensional transverse-effect photodiode 34 is known. The validity of the range measurements may be achieved in a routine manner by using the second set of anodes 34a, 34b in the vertical direction because the spots 12 should occupy unique horizontal and vertical positions on the two-dimensional transverse-effect photodiode 34 depending on the range of the object and which beam is turned on. The vertical and horizontal outputs of the two-dimensional transverse-effect photodiode 34 can be fed into two lookup tables, for example, and the results compared for consistency. If the outputs of the two lookup table disagree, then this indicates that an invalid condition exists, as would be the case, for example, if mirror surfaces were in the field-of-view of the sensor at certain angles which cause virtual images of the beam spot to appear. The photocurrent outputs from the second pair of anodes 35a, 35b may also be processed to calculate a correction term that is used to improve the accuracy of the system 30.

The use of the two-dimensional transverse-effect photodiode 34 used in the present invention has a number of advantages. The two-dimensional transverse-effect photodiode 34 allows the beams to vary in both θ and φ without the imaged spot walking off the detector. θ defines a plane that contains both the two-dimensional transverse-effect photodiode 34 and the LED array projector 31. φ defines a plane which is perpendicular to the first plane and to the line which connects the two-dimensional transverse-effect photodiode 34 and LED array projector 31. This permits the measurement of two-dimensional object profiles in addition to one dimensional profiles. Only one dimensional profiles can be measured using a one dimensional transverse-effect photodiode, such as one developed by VTT, for example.

Two-dimensional transverse-effect photodiode 34 make placement of the sensor system 30 more flexible. In contrast, the use of a one dimensional transverse-effect photodiode forces the beam angle to vary only along q in order to avoid spot walk-off on the one dimensional transverse-effect photodiode. Thus the one-dimensional transverse-effect photodiode and LED projector must lie in the plane defined by the beams. This reduces the flexibility in sensor placement for automotive airbag applications. For example, if it is desired to have a vertical fan of beams illuminate a rear-facing infant seat in the passenger seat, then the LED array projector 31 must be above or below the sensor. This results in a vertically elongated package which is less practical to install in the desirable rear-view mirror position. In the present invention, the use of the two-dimensional transverse-effect photodiode 34 allows vertical or horizontal orientation of the beams with the same sensor-LED array projector orientation, thereby permitting a horizontal package to be installed in the rear-view mirror position.

The use of two-dimensional transverse-effect photodiodes 34 increase the accuracy and sensitivity of the sensor because it decouples spot shifts due to different object ranges from spot shifts due to different beam angles. When a one dimensional transverse-effect photodiode is used, the imaged spot on the photodiode will shift due to the object motion but this shift rides on top of a large shift due to the angle of the beam. Thus the one-dimensional transverse-effect photodiode must be very long in order to prevent the spot moving off the photodiode (spot walk-off). This means the total shift due to the object motion rides on top of a large bias due to the beam angle, which reduces the dynamic range and sensitivity of the sensor. When the two-dimensional transverse-effect photodiode 34 is used, the shifts due to object motion occur horizontally while the shifts due to different beam angles occur vertically, assuming the separation between the two-dimensional transverse-effect photodiode 34 and the LED 11 is horizontal and the beams define a vertical plane. Thus the optical design can be independently optimized for horizontal spot shifts due to object motion which use the entire horizontal length of the two-dimensional transverse-effect photodiode 34 (maximizing sensitivity) and for vertical spot shifts due to different beam angles which maximizes the field-of-view of the sensor.

Figure 4:
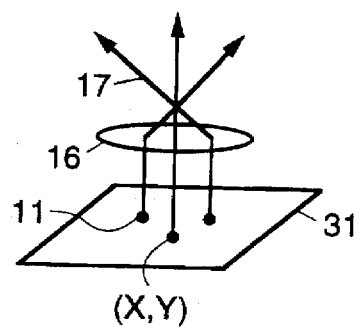
FIG. 4 illustrates a two-dimensional LED array used in the present invention.

Details of the LED array projector 31 used in the present system 30 are shown in FIG. 4. More particularly, FIG. 4 illustrates a two-dimensional LED array projector 31 that provides for three-dimensional range profiling using time-multiplexed optical beams 17. Each optical beam 17 is generated by a separate LED 11 which is mounted in a back focal plane of the projection lens 16 at position (X, Y). The (X, Y) location determines the two deflection angles (θ, φ) of the beam 17. Each LED 11 is individually addressed in a time-multiplexed fashion so that only one beam 17 is on at any one time. This prevents confusion of one beam 17 with another and allows a simple and low-cost two-dimensional transverse-effect photodiode 24 to be used as a detector.

Addressing of the individual LEDs 11 is also greatly simplified. The LED array projector 31 may be made in a small inexpensive package because LED die that form the LEDs 11 are small (200×200 microns) and a single lens 16 is used to project the light from all of the LEDs 11. As each beam 17 is turned on, the range along that beam 17 is determined using the two-dimensional transverse-effect photodiode 24. The number and orientation of the beams 17 may be optimized for the ranges and object shapes expected in the automotive application.

Figure 5:
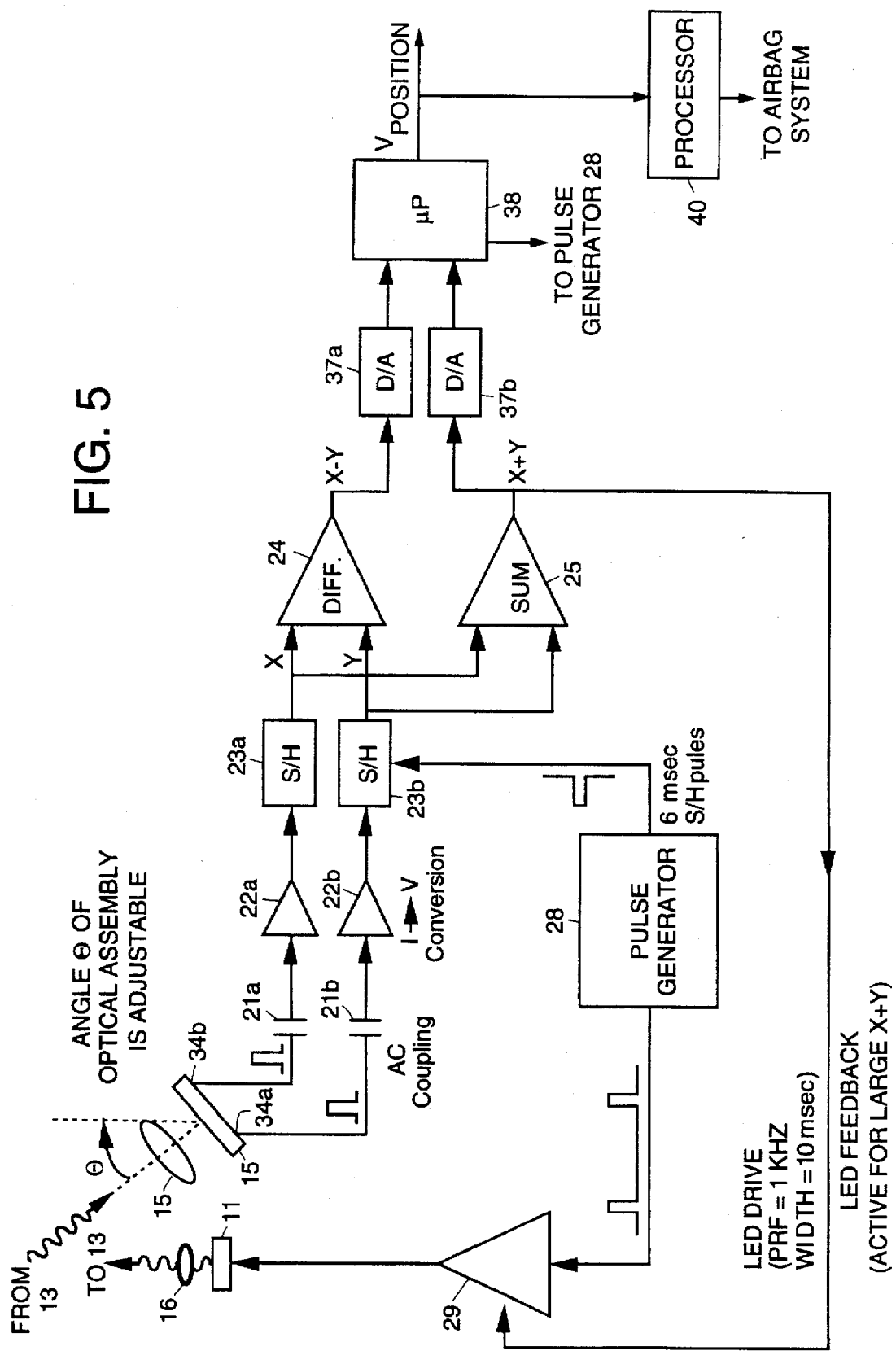
FIG. 5 shows a block diagram of a second embodiment of a multiple-beam optical position sensor system of the present invention.

FIG. 5 shows a block diagram of a second embodiment of a multiple-beam optical position sensor system 30 in accordance with the principles of the present invention. The second embodiment of the system 30 is substantially the same as the embodiment of FIG. 3, but a microprocessor (μP) 38 is used to process digitized output signals from the difference and sum circuits 24a, 24b. First and second analog to digital converters (D/A) 37a, 37b are used to digitize the output signals from the difference and sum circuits 24, 25. Addressing of the individual LEDs 11 may be achieved in a simple manner by using the microprocessor (μP) 38 to control the pulse generator 28 and sequentially pulse each of the LEDs 11.

The multiple-beam optical position sensor system 30 has been specifically developed to be used in conjunction with airbag deployment systems manufactured by the assignee of the present invention. The multiple-beam optical position sensor system 30 may be used to determine the relative position of objects sitting in the passenger seat of a vehicle. The multiple-beam optical position sensor system 30 may be used to determine if an adult is in the seat, an infant disposed in an infant seat positioned in the seat, or an unoccupied infant seat, for example. This is accomplished by illuminating whatever object is in the seat to produce the plurality of light beams 17 that produce spots reflected from the object. The plurality of voltage output signals produced by the two-dimensional transverse-effect photodiode 34 derived from each of the light beams 17 are processed to produce a profile of the object. The profile corresponds to a plurality of calibration curves for the beam 17. The plurality of calibration curves are stored in a processor 40, for example. This profile is compared to stored profiles for a variety of objects, including adults, infant seats, occupied infant seats, and the like. If the profile that is detected is that of an infant in an infant seat, then an output signal from the processor 40 inhibits deployment of the airbag for that seat. This prevents possible injury or death of the infant. If the profile indicates that the object in the seat is a an inanimate object, such as a package, then the processor 40 inhibits deployment of the airbag for that seat. Also, if an adult or other person is too close to the airbag when it is to be deployed, then the processor 40 inhibits deployment of the airbag for that seat.

Thus optical sensor systems for measuring the approximate three-dimensional profile and position of objects has been described. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A multiple-beam optical position sensor system for measuring the approximate three-dimensional profile and position of an object, said system comprising:

a light emitting diode array projector comprising a plurality of light emitting diodes for generating a set of time-multiplexed optical beams that illuminate the object, wherein only one light emitting diode is turned on at any one time, and wherein such beams have different deflection angles which results in arbitrary two-dimensional arrangements of illumination spots on the object;

a two-dimensional transverse-effect photodiode having a first pair of photocurrent outputs for outputting x and y current values that are indicative of x and y locations of reflected spots formed on the photodiode produced by the plurality of beams;

imaging optics for imaging the set of time-multiplexed optical beams onto the two-dimensional transverse-effect photodiode to produce the reflected spots on the photodiode; and processing means coupled between the two-dimensional transverse-effect photodiode and the plurality of light emitting diodes of the light emitting diode array projector for turning on each light emitting diode sequentially in time to generate the set of time-multiplexed optical beams, and for processing signals derived from a pair of photocurrent outputs from the two-dimensional transverse-effect photodiode to determine the x and y location of each imaged spot on the two-dimensional transverse-effect photodiode, and the range to the object along each beam direction, and wherein the x and y locations and range provide an approximate measure of the three-dimensional profile and position of the object.

2. The system of claim 1 wherein the two-dimensional transverse-effect photodiode further comprises a second pair of photocurrent outputs whose output voltages are processed to determine the validity of the range measurement derived from the first pair of photocurrent outputs.

3. The system of claim 1 wherein the two-dimensional transverse-effect photodiode further comprises a second pair of photocurrent outputs that are processed to calculate a correction term that is used to improve the accuracy of the system.

4. The system of claim 1 wherein the two-dimensional transverse-effect photodiode is elongated along x and y dimensions to accommodate shifts in the imaged spots along the x and y directions.

5. The system of claim 1 wherein the imaging optics comprises a single projection lens.

6. The system of claim 1 wherein the processing means comprises:

AC coupling capacitors coupled to respective photocurrent outputs of the transverse-effect photodiode; first and second amplifiers coupled to respective AC coupling capacitors that convert current to voltage;

first and second sample and hold circuits coupled to outputs of the amplifiers for providing x and y position values for the position of the spot on the object;

difference and sum circuits coupled to outputs of the first sample and hold circuit;

a divider coupled to outputs of the difference and sum circuits for producing a voltage value (x−y)/(x+y);

an output amplifier for providing a voltage output ($V_{POSITION}$) that is indicative of the range from the respective light emitting diode to the object, which voltage output corresponds to the voltage value (x−y)/(x+y) when the range is greater than a predetermined threshold, and corresponds to a predetermined fixed voltage value when the range is less than the predetermined threshold;

a LED drive amplifier coupled between the sum circuit and each of the light emitting diodes; and a pulse generator coupled to the sample and hold circuits and to the LED drive amplifier for providing drive signals thereto that pulses the respective light emitting diodes.

7. The system of claim 1 wherein the processing means comprises:

AC coupling capacitors coupled to respective photocurrent outputs of the transverse-effect photodiode;

first and second amplifiers coupled to respective AC coupling capacitors that convert current to voltage;

first and second sample and hold circuits coupled to outputs of the amplifiers for providing x and y position values for the position of the spot on the object;

difference and sum circuits coupled to outputs of the first sample and hold circuit;

first and second analog to digital converters coupled to the difference and sum circuits for digitizing the output signals therefrom;

a LED drive amplifier coupled to the sum circuit and each of the light emitting diodes;

a pulse generator coupled to the sample and hold circuits and to the LED drive amplifier for providing drive signals thereto that pulses the respective light emitting diodes; and a microprocessor coupled to the pulse generator for sequentially addressing the individual LEDs, and coupled to the analog to digital converters for processing the digitized output signals therefrom to produce a voltage value equal to (x−y)/(x+y) and for providing a voltage output that is indicative of the range from the respective light emitting diode to the object that corresponds to the voltage value (x−y)/(x+y) when the range is greater than a predetermined threshold, and that corresponds to a predetermined fixed voltage value when the range is less than the predetermined threshold.

\* \* \* \* \*